United States Patent

[11] 3,590,155

| [72] | Inventor | Philip Ring<br>Jamaica, N.Y. |
|---|---|---|
| [21] | Appl. No. | 33,490 |
| [22] | Filed | Apr. 30, 1970 |
| [45] | Patented | June 29, 1971 |
| [73] | Assignee | Westinghouse Electric Corporation<br>Pittsburgh, Pa.<br>Continuation of application Ser. No.<br>378,603, June 29, 1964, now abandoned. |

[54] PHOTOCHROMIC DISPLAY SYSTEM
8 Claims, 2 Drawing Figs.

[52] U.S. Cl. .................................................. 178/7.5 D,
178/DIG. 31, 178/7.86

[51] Int. Cl. ............................................................. H04n 5/66
[50] Field of Search ............................................. 178/7.3 D,
7.5 D, 6 PC, 7.8, 7.82, 7.85, 6.7; 313/7, 89—92

[56] References Cited
UNITED STATES PATENTS

| 3,067,082 | 12/1962 | Leigh ........................... | 156/84 |
| 3,258,525 | 6/1966 | Piatt et al ...................... | 178/5.4 |

*Primary Examiner*—Robert L. Richardson
*Attorneys*—F. H. Henson, S. Weinberg and E. P. Klipfel ABSTRACT: An optical system for displaying information. Information is written by a cathode-ray tube which has a fiber optic faceplate. A dichroic mirror is deposited on the outer surface of the faceplate. A photochromic film abuts the mirror and is held flat against the mirror by a suction box.

PATENTED JUN29 1971 3,590,155
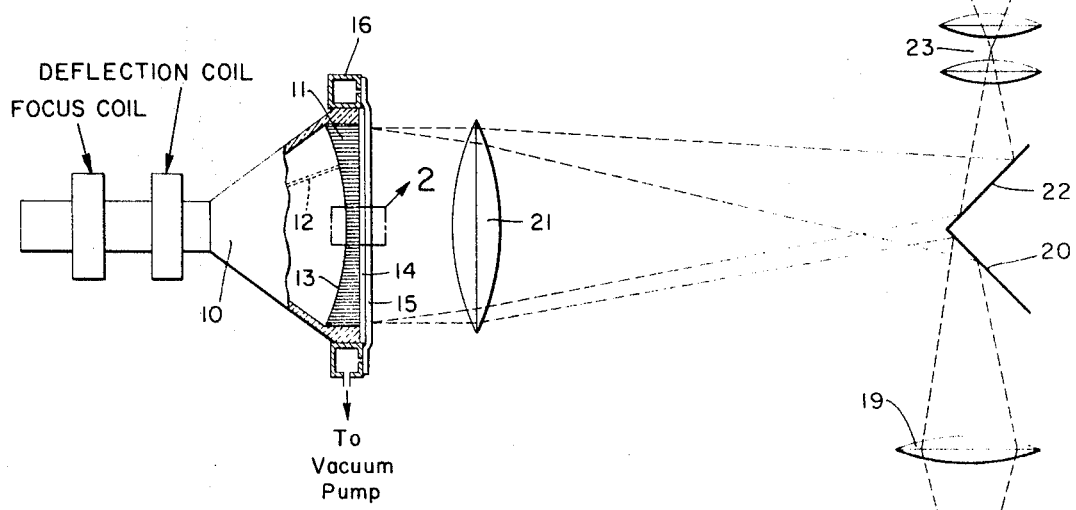
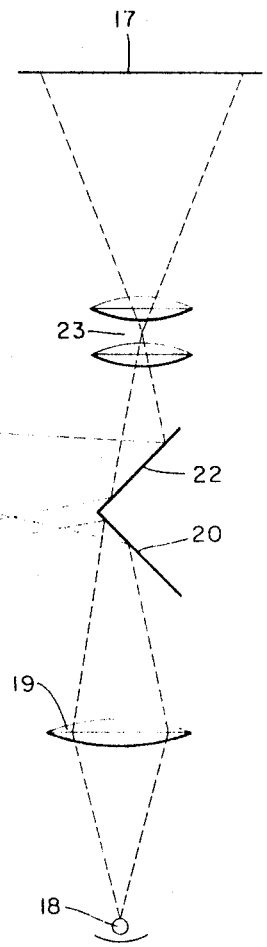
INVENTOR.
PHILIP RING
BY
Douglas R. McKechnie
ATTORNEY
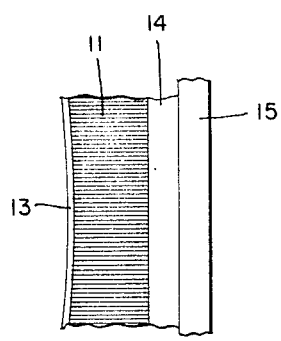

PHOTOCHROMIC DISPLAY SYSTEM

This application is a continuation of application Ser. No. 378,603, filed June 29, 1964, now abandoned.

This invention relates to an optical display system that uses a photochromic material for producing an object of information that is to be displayed.

It is known that certain colorless or transparent materials are photochromic and change color or opacity, i.e., exhibit spectral adsorption effects, on exposure to ultraviolet light. These changes can be reversed by inducing decay upon exposing the material to light and/or heat, or by natural decay, the rate of decay being usually faster the higher the temperature of the material. This characteristic of photochromic materials is known as photochromism and it makes the material particularly applicable to optical display systems. Several prior art systems have been devised such as those illustrated in U. S. Pat. Nos. 3,085,469 and 3,134,297. However, the prior art systems can be considered low contrast systems because they require relatively high writing densities to achieve an effective displayed contrast ratio.

Accordingly, one of the objects of the invention is to provide a novel photochromic display system for displaying one or more movable or stationary objects.

Another object is to provide a novel cathode ray tube for producing an object in photochromic material.

A further object is to provide a photochromic display system wherein a high displayed contrast ratio can be obtained at relatively low writing densities.

Briefly stated, in a preferred embodiment of the invention, a piece of photochromic material is backed by a dichroic mirror which transmits coloring or writing light from a cathode-ray tube into the photochromic material for objectifying (forming an object in) it. The object is imaged on a screen by a reflective projection system that utilizes the dichroic mirror to pass a beam of projecting light twice through the photochromic material to achieve a high contrast.

Other objects and advantages of the invention will be apparent from the following description taken in connection with the accompanying drawing wherein:

FIG. 1 is a schematic view of a photochromic display system embodying the invention; and FIG. 2 is an enlarged schematic view of the detail enclosed in reference box 2 of FIG. 1.

Referring now to the drawing, there is shown a display system that comprises a cathode-ray tube 10, hereafter referred to as CRT 10, having an envelope provided with a fiber optic faceplate 11 wherein the fibers are parallel to the axis of the tube. The outer surface of the faceplate is flat whereas the inner surface is spherical and has a center of curvature approximately at the apex of the deflection of the electron beam 12 of the tube so that the patterns, points and lines formed towards the edge of the faceplate are sharp. The inner surface of faceplate 11 is coated with a layer 13 of a phosphor that emits ultraviolet light upon irradiation thereof by the electron beam.

CRT 10 also includes a conventional electron gun and focus and deflection coils for producing the desired electron beam. It is contemplated that CRT 10 be connected to suitable circuitry that controls the movement and intensity of the electron beam so that the beam writes on layer 13 in the desired pattern representative of the information to be displayed. The fiber optic faceplate 11 is advantageous relative to conventional glass faceplates, wherein the ultraviolet light can diffuse as it passes through the glass, because the fiber optics prevent such diffusion and thereby provide high resolution for the resultant information.

Deposited on the outer surface of faceplate 11 is a dichroic filter or mirror 14 that transmits ultraviolet light and specularly reflects incident visible light. Thus, ultraviolet light emerging from the faceplate 11 passes through the dichroic mirror 14 from the rear to the front thereof. A photochromic film 15 abuts mirror 14 and is held in such position by an annular suction box 16 which surrounds the front end of CRT 10 and is slightly recessed so as to pull film 15 against mirror 14 and hold the film flat. The film 15 comprises transparent photochromic material that colors in response to being irradiated with ultraviolet light. Thus, the ultraviolet light passing through mirror 14 acts as coloring or writing light that irradiates photochromic film 15 to form therein an object of the desired optical information, the object being defined by the areal distribution and/or intensity of color.

It is to be understood that although a nonreversible type of photochromic material could be used, a reversible type is preferred since this latter type readily allows moving objects to be displayed and allows the film to be reused. In the case of moving or time variable objects, it is preferred that the photochromic material be selected so as to have a persistency that allows the path of the moving object to be displayed. This persistency can be controlled through use of auxiliary energy such as additional light or heat.

Means are also provided for imaging or projecting the object formed in the photochromic film 15 onto a display screen 17 by reflective projection techniques. This means comprises a projection lamp 18 that produces a beam of visible light which passes through a condenser lens 19 and is reflected off the surface of a mirror 20 through a field or collimating lens 21 onto film 15. Lens 21 is located in front of film 15 and has its axis aligned with that of CRT 10, mirror 20 being slightly to one side of the axis of lens 21. This incident light beam passing through lens 21 passes rearwardly through film 15 and is reflected by dichroic mirror 14 back through film 15 and lens 21 onto a mirror 22 located slightly off axis adjacent to mirror 20. Mirror 22 reflects the beam, which now contains the image formed by the photochromic film 15, through a projection lens 23 that focuses the desired image on screen 17.

In the display system, the use of dichroic mirror 14 and the reflective projection system produces several advantages. The passing of the projecting light beam twice through film 15 produces a square-law increase in the displayed contrast ratio. For example, to obtain an exemplary contrast ratio of 25:1 it is necessary that film 15 be written to an effective contrast of only 5:1. Therefore, the required photochromic writing density is relatively low and writing can be accomplished at higher speeds. Furthermore, the use of lower density writing not only increases the life of the photochromic film but it also decreases the chance of burning the layer 13 of phosphor.

It might also be desired to use a further object, such as a transparency or mask, to add additional information to the light beam, such as a map or grid network, whereby the resultant images of both objects are imposed upon the image produced through use of the photochromic material. This might be desirable in air traffic control systems or in military systems for displaying targets.

While only a single embodiment has been illustrated, it will be apparent to those skilled in the art that changes can be made in the details and arrangement of parts without departing from the scope of the invention as defined in the appended claims.

I claim:

1. In combination, a cathode-ray tube, means associated with said cathode-ray tube means for displaying an image, suction means for maintaining said image displaying means in juxtaposition to said cathode-ray tube, said suction means including a surface portion, said surface portion having an aperture means, a portion of said image displaying means abutting said aperture means.

2. The combination of claim 1 wherein said image displaying means is abutting said cathode-ray tube means.

3. The combination of claim 2 wherein said cathode-ray tube means includes means for generating and transmitting said displayable image, said generating and transmitting means being so arranged that said image displaying means abuts it.

4. The combination of claim 3 wherein said portion of said image displaying means overlaps said generating and transmitting means.

5. The combination of claim 4 wherein said suction means is disposed in such a manner as to pull said overlapping portion toward said generating and transmitting means to maintain the nonoverlapping portion of said image displaying means flat against said generating and transmitting means.

6. The combination of claim 1 wherein said suction means includes an annular suction means having an annular aperture means, said annular suction means surrounding said generating and transmitting means and being operatively connected to a vacuum means.

7. The combination of claim 6 wherein said portion of said image displaying means overlaps said generating and transmitting means and wherein said overlapping portion abuts said surface portion of said suction means.

8. The combination of claim 9, wherein said image displaying means is a photochromic film.